United States Patent
Hu et al.

(10) Patent No.: US 11,131,258 B2
(45) Date of Patent: Sep. 28, 2021

(54) METHODS AND SYSTEM FOR REDUCING ENGINE HYDROCARBON EMISSIONS

(71) Applicant: Ford Global Technologies, LLC, Dearborn, MI (US)

(72) Inventors: Leon Hu, Bloomfield Hills, MI (US); James Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/797,851

(22) Filed: Feb. 21, 2020

(65) Prior Publication Data

US 2021/0262401 A1    Aug. 26, 2021

(51) Int. Cl.
| F02D 41/00 | (2006.01) |
| F02D 41/06 | (2006.01) |
| F02B 37/18 | (2006.01) |
| F02P 5/04 | (2006.01) |
| F02P 5/15 | (2006.01) |

(52) U.S. Cl.
CPC ........ F02D 41/0007 (2013.01); F02B 37/183 (2013.01); F02D 41/064 (2013.01); F02P 5/045 (2013.01); F02P 5/15 (2013.01); *F02D 2200/021* (2013.01); *F02D 2200/0802* (2013.01); *F02D 2200/101* (2013.01)

(58) Field of Classification Search
CPC ............... F02D 41/0007; F02D 41/064; F02D 2200/021; F02D 2200/0802; F02D 2200/101; F02B 37/183; F02P 5/045; F02P 5/15
See application file for complete search history.

(56) References Cited

U.S. PATENT DOCUMENTS

| 2015/0267649 A1* | 9/2015 | Remes | F02M 26/04 60/605.2 |
| 2016/0097319 A1* | 4/2016 | Matsunaga | F02B 37/18 60/602 |
| 2017/0044948 A1* | 2/2017 | Caine | F01N 3/0885 |
| 2017/0096957 A1* | 4/2017 | Wu | F01L 1/34 |
| 2018/0066575 A1* | 3/2018 | Ossareh | F02B 37/183 |
| 2019/0032548 A1* | 1/2019 | Morikawa | F02D 41/0007 |

FOREIGN PATENT DOCUMENTS

| FR | 2578910 A2 | 9/1986 |
| JP | 2008309004 A * | 12/2008 |
| JP | 2009275587 A | 11/2009 |
| JP | 2015183624 A | 10/2015 |

* cited by examiner

*Primary Examiner* — Audrey B. Walter
(74) *Attorney, Agent, or Firm* — Geoffrey Brumbaugh; McCoy Russell LLP (57) ABSTRACT

A method for operating an engine that includes a turbocharger with a wastegate is described. In one example, the method includes oscillating a position of the wastegate during cold engine starting as a function of a speed of an engine. The wastegate position may be adjusted to follow a square wave, sinusoidal wave, or triangle wave.

19 Claims, 5 Drawing Sheets

METHODS AND SYSTEM FOR REDUCING ENGINE HYDROCARBON EMISSIONS

FIELD

The present description relates to methods and a system for operating an engine that includes a turbocharger. The methods and systems may be applied during cold engine starting to reduce engine hydrocarbon emissions.

BACKGROUND AND SUMMARY

An engine may be cold started from time to time to prepare a vehicle for service. Hydrocarbon emissions from the engine may be higher when the engine is cold started as compared to if the engine is at its operating temperature because of clearance between engine components and because combustion within engine cylinders may be less complete. While it may be possible to combust hydrocarbons emitted from an engine via a catalyst when the engine and the catalyst are warm, conversion efficiency of a catalyst may be low when the engine and the catalyst are relatively cold. Therefore, it may be desirable to provide a way of reducing engine hydrocarbon emissions during conditions when an engine and catalyst are cold.

The inventors herein have recognized the above-mentioned issues and have developed an engine operating method, comprising: oscillating a position of a turbocharger wastegate at a predetermined rate in response to a cold engine start via a controller.

By oscillating a position of a turbocharger wastegate between a first open position and a second open position, it may be possible to increase mixing of gases in an exhaust system so that hydrocarbons may be oxidized within a turbocharger housing and nearby exhaust passages. In particular, turbulence of exhaust gas flow within the turbocharger and upstream of the turbocharger may be increased by oscillating the position of the turbocharger wastegate. The increased turbulence may increase mixing of $O_2$ and hydrocarbons within and upstream of the turbocharger housing to improve hydrocarbon oxidation within the engine's exhaust system. Consequently, engine hydrocarbon emissions may be reduced.

The present description may provide several advantages. Specifically, the approach may reduce engine hydrocarbon emissions during cold engine starts. Further, the approach may be adjusted for a variety of engine operating conditions. In addition, the approach may reduce hydrocarbon emissions without creating vehicle drivability issues. Further, hydrocarbon emissions may be reduced without compromising engine power.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
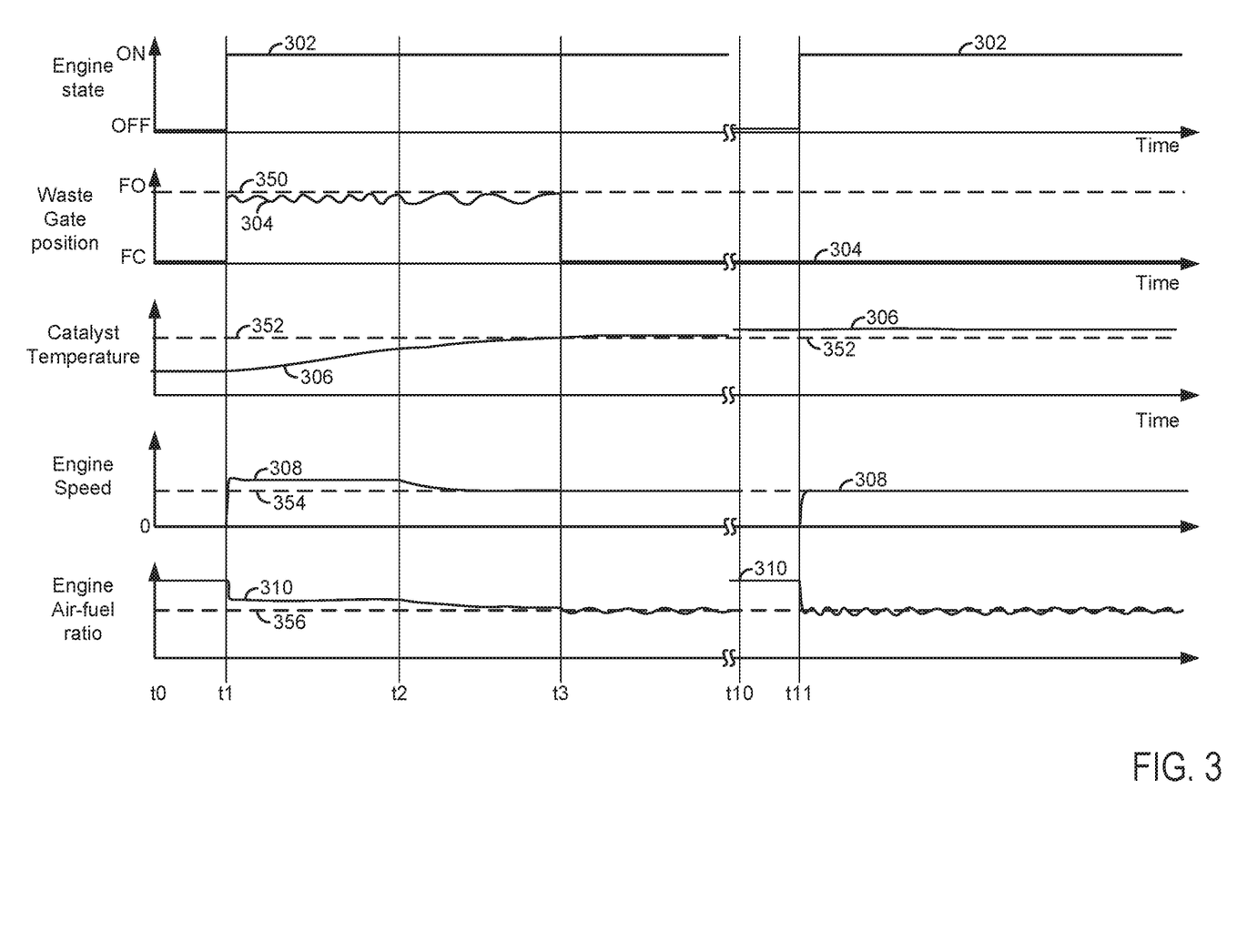
FIG. 3 shows prophetic engine starting sequences.
Figure 4:
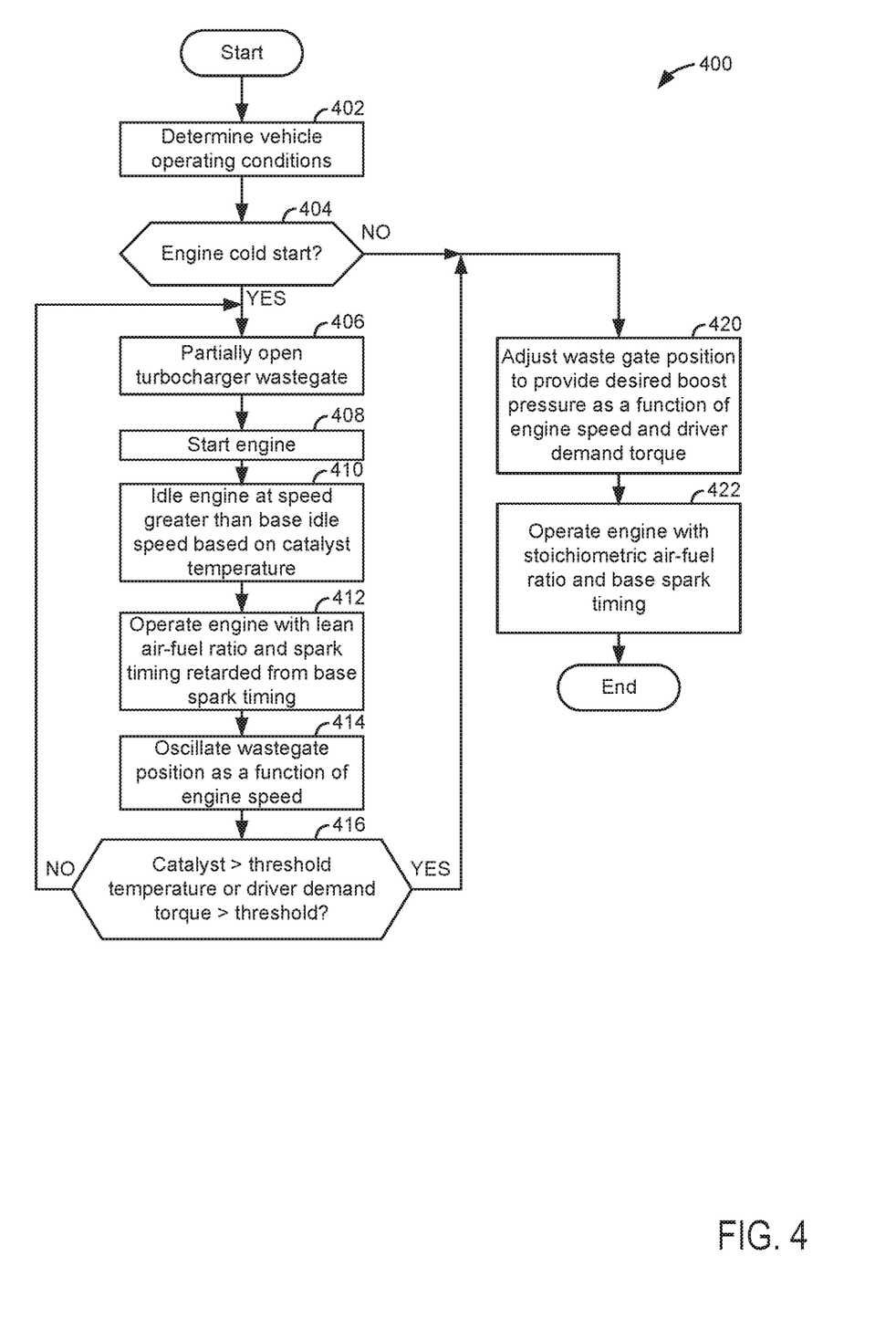
FIG. 4 shows a flowchart of a method for operating an engine.
Figure 5:
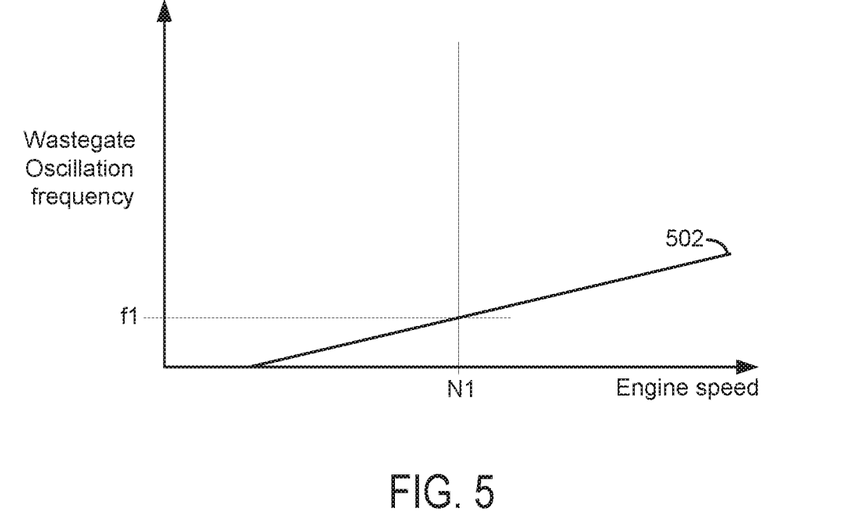
FIGS. 5 and 6 show example wastegate control functions.
Figure 6:
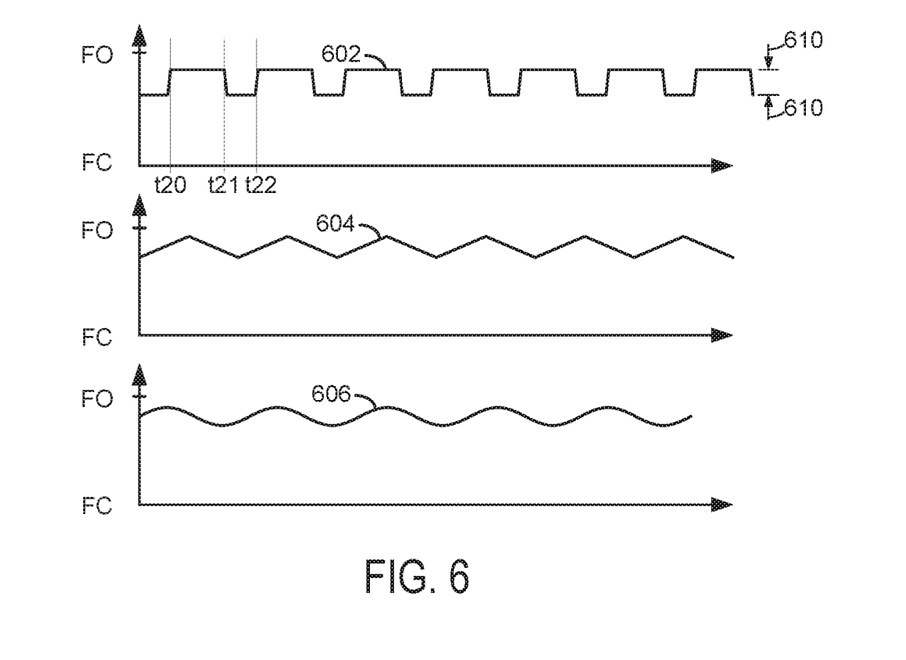

The present description is related to operating a turbocharged engine. In particular, a turbocharger wastegate valve is adjusted in a way that may promote mixing of oxygen and hydrocarbons during and shortly after an engine cold start so that engine hydrocarbon emissions may be reduced. By adjusting a position of a wastegate, turbulence may be generated within an exhaust system so that hydrocarbons may be oxidized more efficiently. The engine may be of the type shown in FIG. 1. The wastegate valve may be of the type described and shown in FIG. 2. An engine operating sequence that may reduce engine hydrocarbon emissions is shown in FIG. 3. A flowchart of a method to reduce engine hydrocarbon emissions is shown in FIG. 4. Example turbocharger wastegate control functions are shown in FIGS. 5 and 6.

Figure 1:
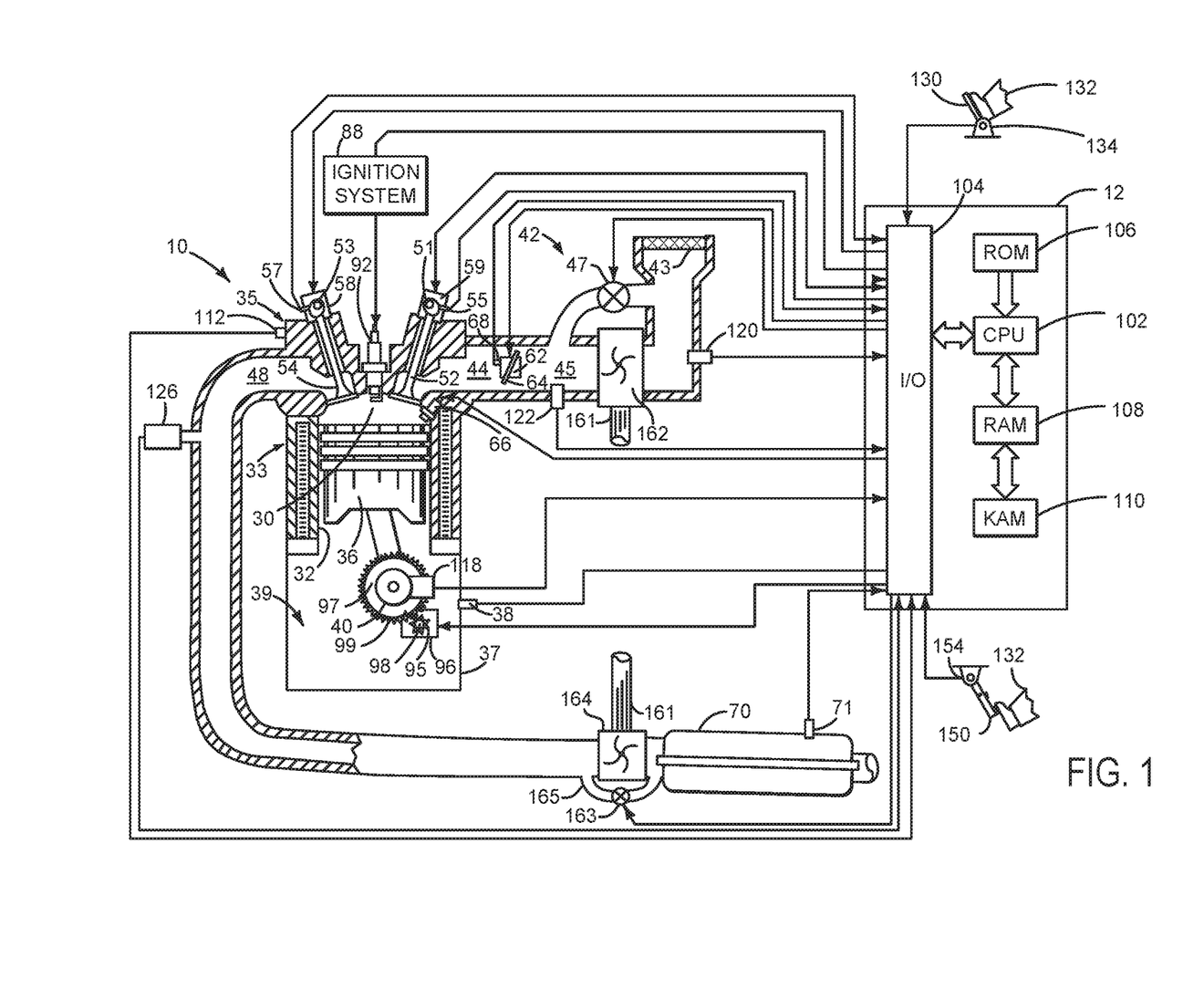
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown)

including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 via bypass passage 165 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. Temperature of converter 70 may be determined via temperature sensor 71 or via inferring it from engine speed, engine load, spark timing, and engine air-fuel ratio.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an accelerator pedal 130 for sensing force applied by human foot 132; a position sensor 154 coupled to brake pedal 150 for sensing force applied by foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
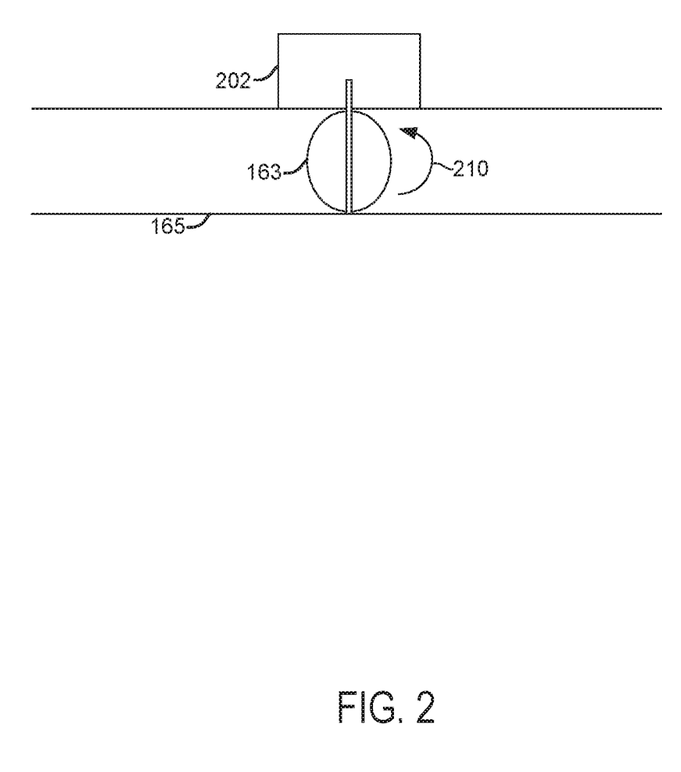
FIG. 2 shows a schematic diagram of an example wastegate valve and wastegate valve actuator.

FIG. 2 shows a detailed view of wastegate 163. Wastegate actuator 202 may rotate wastegate 163 as indicated by arrow 210 to selectively open or block bypass passage 165. Substantailly all exhaust gases pass through turbine 164 when wastegate 163 is fully closed. Wastegate actuator 202 may be an electric motor, hydraulic actuator, pneumatic actuator, or an electro-hydraulic actuator, or an electro-pneumatic actuator. In this example, wastegate 163 is configured as a butterfly valve, but in other examples, wastegate 163 may be configured as an alternative type of valve.

Thus, the system of FIGS. 1 and 2 provides for an engine system, comprising: an engine including a turbocharger, the turbocharger including a wastegate; and a controller including executable instructions stored in non-transitory memory that cause the controller to adjust a position of a wastegate at a predetermined frequency when a temperature is less than a threshold temperature. The engine system includes where the temperature is an engine temperature. The engine system includes where the temperature is a catalyst temperature. The engine system further comprises additional instructions to adjust a duty cycle of the wastegate. The engine system includes where the duty cycle is adjusted as a function of engine speed. The engine system further comprises additional instructions to cease adjusting the position of the wastegate at the predetermined frequency in response to the temperature being greater than the threshold temperature. The engine system further comprises additional instructions to adjust an air-fuel ratio of the engine at a harmonic of the predetermined frequency. The engine system includes where the predetermined frequency is a function of engine speed.

Referring now to FIG. 3, an engine operating sequence according to the method of FIG. 4 is shown. The engine operating sequence of FIG. 3 may be provided via the system of FIGS. 1 and 2 in cooperation with the method of FIG. 4. The plots shown in FIG. 3 are time aligned and occur at the same time. The vertical lines represent times of interest during the sequence. The SS marks along the horizontal axis represent breaks in time and the breaks may be short or long in duration.

The first plot from the top of FIG. 3 is a plot of engine operating state versus time. The vertical axis represents the engine operating state and the engine is operating (e.g., rotating and combusting fuel) when trace 302 is at the level of "ON." The engine is not operating (e.g., not combusting fuel) when trace 302 is at the level of "OFF." The horizontal axis represents time and time increases from the left side of the figure to the right side of the figure. Trace 302 represents the engine operating state.

The second plot from the top of FIG. 3 is a plot of turbocharger wastegate position versus time. The vertical axis represents the turbocharger wastegate position and the turbocharger wastegate position increases in the direction of the vertical axis arrow. The turbocharger wastegate opening amount increases with increasing wastegate position. The wastegate is fully open when trace 304 is at the level of label "FO" (e.g., fully open). The wastegate is fully closed when trace 304 is at the level of label "FC" (e.g., fully closed). The horizontal axis represents time and time increases from the left side of the figure to the right side of the figure. Trace 304 represents the turbocharger wastegate position. Horizontal line 350 represents a position at which the turbocharger wastegate is fully open.

The third plot from the top of FIG. 3 is a plot of catalyst temperature versus time. The vertical axis represents the catalyst temperature and the catalyst temperature increases in the direction of the vertical axis arrow. The horizontal axis represents time and time increases from the left side of the figure to the right side of the figure. Trace 306 represents the catalyst temperature. Horizontal line 352 represents a catalyst threshold temperature (e.g., a catalyst light off temperature at which catalyst efficiency is greater than a threshold efficiency).

The fourth plot from the top of FIG. 3 is a plot of engine speed versus time. The vertical axis represents the engine speed and the engine speed increases in the direction of the vertical axis arrow. The horizontal axis represents time and time increases from the left side of the figure to the right side of the figure. Trace 308 represents engine speed. Horizontal line 354 represents a base warm engine idle speed.

The fifth plot from the top of FIG. 3 is a plot of engine air-fuel ratio versus time. The vertical axis represents the engine air-fuel ratio and the engine air-fuel ratio increases in the direction of the vertical axis arrow. The horizontal axis represents time and time increases from the left side of the figure to the right side of the figure. Trace 310 represents the engine air-fuel ratio. Horizontal line 356 represents a stoichiometric air-fuel ratio.

At time t0, the engine is off (e.g., not combusting fuel and not rotating) and the turbocharger wastegate is fully closed. The catalyst temperature is less than the threshold catalyst temperature and engine speed is zero. The engine air-fuel ratio is very lean.

At time t1, the engine is cold started and the turbocharger wastegate is opened in response to the engine being cold started. The catalyst temperature is low, but it begins to increase after the engine is started. The engine is idled at an elevated speed to increase a rate of catalyst heating. The engine air-fuel ratio is lean.

Between time t1 and time t2, the engine continues to operate and the turbocharger wastegate position is oscillated in a sinusoidal fashion to increase mixing of oxygen and hydrocarbons in the exhaust system. The increased mixing may facilitate oxidation of hydrocarbons so that tailpipe hydrocarbons may be reduced. Further, since the catalyst is less than the threshold temperature 352, the hydrocarbons may be oxidized at a time when catalyst efficiency is low, thereby increasing the importance of oxidizing hydrocarbons in the exhaust manifold and turbocharger housing. The catalyst temperature increases as the engine continues to operate and engine speed is held at the elevated idle speed. The engine air-fuel ratio is maintained lean.

At time t2, the engine continues to operate and the frequency of oscillation of the turbocharger wastegate is reduced as engine speed is reduced. The engine speed is reduced to increase engine efficiency as the catalyst temperature approaches threshold temperature 352. The engine air-fuel ratio is also richened toward a stoichiometric air-fuel ratio as the catalyst temperature increases.

Between time t2 and time t3, the engine speed is reduced in response to the increasing catalyst temperature. The frequency of oscillation of the turbocharger wastegate is also reduced in response to the decreasing engine speed. The engine air-fuel ratio is reduced toward a stoichiometric air-fuel ratio.

At time t3, the engine continues to operate and the catalyst temperature reaches threshold temperature 352. The turbocharger wastegate ceases oscillating and the turbocharger wastegate is fully closed in response to catalyst temperature exceeding threshold 352. The engine idles at a warm idle speed and the engine air-fuel ratio is stoichiometric. The engine is stopped after time t3 and before time t10.

Thus, when the engine is cold started, the turbocharger wastegate may be oscillated to improve mixing of exhaust gases in the engine's exhaust manifold and turbocharger housing so as to increase oxidation of hydrocarbons. The wastegate position oscillation ceases when the catalyst reaches a threshold temperature.

At time t10, the engine is off (e.g., not combusting fuel and not rotating) and the turbocharger wastegate is fully closed. The catalyst temperature is greater than temperature 352 and engine speed is zero. The engine air-fuel ratio is very lean since the engine is not running.

At time t11, the engine is started. The engine is warm started in this example. The turbocharger wastegate remains fully closed and the catalyst temperature remains above threshold temperature 352. The engine is idled at its base idle speed and the engine operates with a stoichiometric air-fuel ratio.

In this way, an engine may be cold started via a procedure that is different from when the engine is warm started. The cold engine starting procedure leverages turbocharger wastegate position changes to facilitate hydrocarbon oxidation via increasing turbulence within the engine's exhaust system. The warm engine starting procedure foregoes turbocharger wastegate position changes since the catalyst is warm and able to convert hydrocarbons at a high efficiency.

Referring now to FIG. 4, a method for operating an engine is shown. At least portions of method 400 may be implemented as executable controller instructions stored in non-transitory memory. Method 400 may operate in cooperation with the system of FIGS. 1 and 2.

Additionally, portions of method 400 may be actions taken in the physical world to transform an operating state of an actuator or device. The method of FIG. 4 may be incorporated into the system of FIGS. 1 and 2 as executable instructions stored in non-transitory memory.

At 402, method 400 determines engine operating conditions. Engine operating conditions may include but are not limited to engine temperature, catalyst temperature, engine speed, engine load, driver demand torque, and barometric pressure. The engine operating conditions may be determined or estimated via the sensors and actuators that are described herein. Method 400 proceeds to 404.

At 404, method 400 judges if an engine cold start is requested. That is, method 400 determines if the engine and catalyst are cold (e.g., less than a warm stabilized engine operating temperature and/or less than a threshold catalyst temperature) and an engine start is requested. If so, the answer is yes and method 400 proceeds to 406. Otherwise, the answer is no and method 400 proceeds to 420.

At 420, method 400 adjusts a turbocharger wastegate to a position that provides a desired boost pressure in the engine intake system. The desired boost pressure may be a function of engine speed and driver demand torque. If the engine is at idle speed, the wastegate may be fully closed. The wastegate may be opened as engine speed and load increase since higher exhaust gas flow rates may generate higher boost pressures via rotating the turbocharger at higher speeds. The wastegate is not oscillated or cycled when the engine is warm. Method 400 proceeds to 422.

At 422, method 400 operates the engine with a stoichiometric air-fuel ratio and base spark timing. The base spark timing is empirically determined as a function of engine speed and engine load. Method 400 proceeds to exit.

At 406, method 400 partially opens the turbocharger wastegate. For example, method 400 may open the turbocharger wastegate to 85% of fully open. By opening the turbocharger wastegate, exhaust gas energy may be directed to the catalyst without flowing through the turbocharger turbine so that the catalyst may reach a threshold temperature (e.g., light off temperature) sooner. Method 400 proceeds to 408.

At 408, method 400 method 400 starts the engine via rotating the engine with the starter and by supplying fuel and spark to the engine. Method 400 proceeds to 410.

At 410, method 400 accelerates the engine to a cold engine idle speed. The cold engine idle speed is greater than a warm engine idle speed or a base engine idle speed. The engine is operated at the cold engine idle speed to increase catalyst warming. The cold engine idle speed may be a function of an engine temperature and/or a catalyst temperature. Method 400 proceeds to 410.

At 412, method 400 operates the engine with a lean air-fuel ratio and spark timing that is retarded from base spark timing. Operating the engine with a lean air-fuel ratio may reduce engine hydrocarbons and operating the engine at retarded spark timing may increase a rate of catalyst heating. Method 400 proceeds to 414.

At 414, method 400 oscillates a position of the turbocharger wastegate at a predetermined frequency. For example, method 400 may move the turbocharger wastegate back and forth from 85% of fully open position to 95% of fully open position to follow a waveform and generate a varying position that may increase turbulence within the engine's exhaust system. By moving the turbocharger wastegate position, turbulence may be created in the exhaust system to promote oxidation of hydrocarbons that may be in the engine exhaust manifold and turbocharger manifold.

In one example, the position of the turbocharger wastegate may be adjusted in a sinusoidal fashion as shown in FIG. 6. Alternatively, the position of the turbocharger wastegate may be adjusted to provide or follow a square wave as shown in FIG. 6. In still another example, method 400 may adjust the position of the turbocharger wastegate to provide or follow a triangle wave as shown in FIG. 6.

The frequency of the wastegate position adjustments may be a function of engine speed since engine speed may be indicative of a frequency that exhaust gas is pushed into the engine's exhaust system. By adjusting wastegate position as a function of engine speed, movement of the turbocharger wastegate may be a harmonic of a frequency that exhaust gases are ejected from engine cylinders into the engine's exhaust system, which may increase hydrocarbon oxidation in the exhaust system via increasing turbulence within the engine's exhaust system. In one example, the frequency of wastegate position adjustment may be empirically determined via operating the engine on a dynamometer and adjusting frequency of wastegate position movements to determine a frequency at which a greater percentage of hydrocarbons in the exhaust system may be oxidized.

Method 400 may also adjust amplitude of the turbocharger wastegate position. In one example, the turbocharger wastegate amplitude position may be adjusted as a function of engine speed and load or engine air flow amount. For example, at lower engine speeds and loads, the wastegate position amplitude may be 10% of a full scale position when the wastegate is fully open. Consequently, the turbocharger wastegate may be moved from 75% of full open position to 85% of full open position, for example. At higher engine speeds and loads, the turbocharger wastegate position amplitude may be 5% of full scale position when the wastegate is fully open. Therefore, the turbocharger wastegate may be moved from 85% of full open position to 90% of full open position, for example. By adjusting the amplitude of turbocharger wastegate position, it may be possible to improve hydrocarbon oxidation for a range of engine speeds and loads so that engine tailpipe emissions may be reduced. In one example, the amplitude of wastegate position adjustment may be empirically determined via operating the engine on a dynamometer and adjusting amplitude of wastegate position movements to determine a wastegate position amplitude at which a greater percentage of hydrocarbons in the exhaust system may be oxidized.

In some examples, method 400 may adjust the turbocharger wastegate to change position at a fixed frequency while the duty cycle of the turbocharger wastegate movement may be adjusted in response to engine speed. For example, the wastegate may be commanded to change positions at a frequency of 1.5 Hertz and the duty cycle may be changed from 55% to 75% as explained in further detail in the description of FIG. 6.

The turbocharger wastegate may be oscillated to follow a square wave, triangle wave, sinusoidal wave, or random wave to increase turbulence within the exhaust system. Example waveforms are shown in FIG. 6. Method 400 proceeds to 416.

At 418, method 400 judges whether or not a temperature of the catalyst is greater than a threshold temperature (e.g., a catalyst light off temperature) or driver demand torque is greater than a threshold. Optionally, method 400 may judge whether or not a temperature of the engine is greater than a threshold temperature or driver demand torque is greater than a threshold. If method 400 judges that a temperature of the catalyst is greater than a threshold temperature or driver demand torque is greater than a threshold, then the answer is yes and method 400 proceeds to 420. Otherwise, the answer is no and method 400 returns to 406. Alternatively, if method 400 judges that a temperature of the engine is greater than a threshold temperature or driver demand torque is greater than a threshold, then the answer is yes and method 400 proceeds to 420. Otherwise, the answer is no and method 400 returns to 406.

Thus, method 400 adjusts a position of a wastegate to oscillate between two different wastegate opening positions. The frequency and the amplitude of the wastegate position adjustments may be adjusted to optimize oxidation of hydrocarbons within the exhaust system and the turbocharger housing.

The method of FIG. 4 provides for an engine operating method, comprising: oscillating a position of a turbocharger wastegate at a predetermined rate in response to a cold engine start via a controller. The method includes where oscillating the position of the turbocharger wastegate includes commanding the position of the turbocharger wastegate to a first position and a second position. The method includes where the first position is less than fully open and where the second position is less than fully open. The method includes where the first position is a position where the wastegate is wider open than the second position. The method further comprises operating an engine that includes the turbocharger with a lean air-fuel ratio in response to the cold engine start. The method further comprises operating the engine with spark timing that is retarded from a base spark timing in response to the cold engine start. The method includes where the oscillating the position of the wastegate includes moving the wastegate sinusoidally. The method includes where the oscillating the position of the wastegate includes moving the wastegate to follow a square wave.

The method of FIG. 4 also provides for an engine operating method, comprising: via a controller, adjusting a position of a turbocharger wastegate at a predetermined rate in response to a temperature being less than a threshold temperature, where adjusting the position of the turbocharger wastegate includes adjusting an amplitude of the position of the turbocharger wastegate as a function of engine air mass. The method includes where the predetermined rate is a function of a speed of an engine. The method further comprises ceasing to adjust the position of the turbocharger wastegate at the predetermined rate in response to the temperature being greater than the threshold temperature. The method further comprises adjusting an idle speed of the engine to a speed that is greater than a base engine idle speed.

Referring now to FIG. 5, a plot of wastegate oscillation frequency versus engine speed is shown. The vertical axis represents the frequency at which the wastegate may be oscillated. The horizontal axis represents engine speed. Line 502 represents a relationship between engine speed and frequency at which the wastegate may be oscillated during engine cold starts. When the engine is operated at a speed N1, the turbocharger wastegate may be adjusted to follow a waveform with a frequency of f1 via changing a position of the turbocharger wastegate. The relationship represented via line 502 may be determined via operating an engine on a dynamometer and monitoring tailpipe exhaust emissions while adjusting a frequency that the turbocharger wastegate position changes.

Referring now to FIG. 6, example position movements that a turbocharger wastegate may generate are shown. The position movements may be generated by commanding the turbocharger wastegate to follow a predetermined waveform that is stored in controller memory, or alternatively, the engine controller may generate a waveform for the turbocharger wastegate to follow.

The first plot from the top of FIG. 6 is a plot of turbocharger wastegate position versus time. The vertical axis represents the turbocharger wastegate position and the turbocharger wastegate position increases in the direction of the vertical axis arrow. The turbocharger wastegate opening amount increases with increasing wastegate position. The wastegate is fully open when trace 602 is at the level of label "FO" (e.g., fully open). The wastegate is fully closed when trace 602 is at the level of label "FC" (e.g., fully closed). The horizontal axis represents time and time increases from the left side of the figure to the right side of the figure. Trace 602 represents the turbocharger wastegate position.

In this example, the turbocharger wastegate position is adjusted to generate a square wave motion or change in turbocharger wastegate position. The turbocharger wastegate may be commanded via the controller to follow a square wave that oscillates at a predetermined frequency. In this example, the period of turbocharger wastegate position movement is an amount of time from t20 to time t22. The frequency of turbocharger position movement is 1/period of turbocharger wastegate position movement. The duty cycle of the wastegate position may be changed in response to engine speed. The duty cycle is a portion of the wastegate position that is opened the greatest amount during the period of the wastegate movement. For example, the duty cycle of wastegate position 602 is the portion of the period between time t20 and time t21. In this example, the duty cycle is about 75% since the period of wastegate position 602 is between time t20 and time t22; however, the duty cycle may be adjusted to optimize hydrocarbon oxidation within the exhaust manifold and turbocharger housing.

The amplitude of wastegate position movement may also be adjusted. Amplitude of wastegate position movement is indicated between arrows 610. In one example, the amplitude may be adjusted in response to engine air mass flow rate. In another example, the amplitude may be adjusted in response to engine speed and load.

The second plot from the top of FIG. 6 is a plot of turbocharger wastegate position versus time. The vertical axis represents the turbocharger wastegate position and the turbocharger wastegate position increases in the direction of the vertical axis arrow. The turbocharger wastegate opening amount increases with increasing wastegate position. The wastegate is fully open when trace 604 is at the level of label "FO" (e.g., fully open). The wastegate is fully closed when trace 604 is at the level of label "FC" (e.g., fully closed). The horizontal axis represents time and time increases from the left side of the figure to the right side of the figure. Trace 604 represents the turbocharger wastegate position.

In this example, the turbocharger wastegate position is adjusted to generate a triangle wave change in position. The turbocharger wastegate may be commanded via the controller to follow a triangle wave that oscillates at a predetermined frequency. The motion of turbocharger wastegate position 604 is triangular.

The third plot from the top of FIG. 6 is a plot of turbocharger wastegate position versus time. The vertical axis represents the turbocharger wastegate position and the turbocharger wastegate position increases in the direction of the vertical axis arrow. The turbocharger wastegate opening amount increases with increasing wastegate position. The wastegate is fully open when trace 606 is at the level of label "FO" (e.g., fully open). The wastegate is fully closed when trace 606 is at the level of label "FC" (e.g., fully closed). The horizontal axis represents time and time increases from the left side of the figure to the right side of the figure. Trace 606 represents the turbocharger wastegate position.

In this example, the turbocharger wastegate position is adjusted to generate a sinusoidal wave change in position. The turbocharger wastegate may be commanded via the controller to follow a sinusoidal wave that oscillates at a predetermined frequency. The motion of turbocharger wastegate position 606 is sinusoidal.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   oscillating a position of a turbocharger wastegate at a predetermined rate in response to a cold engine start via a controller.

2. The method of claim 1, where oscillating the position of the turbocharger wastegate includes commanding the position of the turbocharger wastegate to a first position and a second position.

3. The method of claim 2, where the first position is less than fully open and where the second position is less than fully open.

4. The method of claim 3, where the first position is a position where the wastegate is wider open than the second position.

5. The method of claim 1, further comprising operating an engine that includes the turbocharger with a lean air-fuel ratio in response to the cold engine start.

6. The method of claim 5, further comprising operating the engine with spark timing that is retarded from a base spark timing in response to the cold engine start.

7. The method of claim 1, where the oscillating the position of the wastegate includes moving the wastegate sinusoidally.

8. The method of claim 1, where the oscillating the position of the wastegate includes moving the wastegate to follow a square wave.

9. An engine system, comprising:
   an engine including a turbocharger, the turbocharger including a wastegate; and
   a controller including executable instructions stored in non-transitory memory that cause the controller to adjust a position of the wastegate at a predetermined frequency when a temperature is less than a threshold temperature, where the predetermined frequency is a function of engine speed.

10. The engine system of claim 9, where the temperature is an engine temperature.

11. The engine system of claim 9, where the temperature is a catalyst temperature.

12. The engine system of claim 9, further comprising additional instructions to adjust a duty cycle of the wastegate.

13. The engine system of claim 12, where the duty cycle is adjusted as a function of engine speed.

14. The engine system of claim 9, further comprising additional instructions to cease adjusting the position of the wastegate at the predetermined frequency in response to the temperature being greater than the threshold temperature.

15. The engine system of claim 9, further comprising additional instructions to adjust an air-fuel ratio of the engine at a harmonic of the predetermined frequency.

16. An engine operating method, comprising:
   via a controller, adjusting a position of a turbocharger wastegate at a predetermined rate in response to a temperature being less than a threshold temperature, where adjusting the position of the turbocharger wastegate includes adjusting an amplitude of the position of the turbocharger wastegate as a function of engine air mass.

17. The method of claim 16, where the predetermined rate is a function of a speed of an engine.

18. The method of claim 16, further comprising ceasing to adjust the position of the turbocharger wastegate at the predetermined rate in response to the temperature being greater than the threshold temperature.

19. The method of claim 16, further comprising adjusting an idle speed of the engine to a speed that is greater than a base engine idle speed.

* * * * *